C. L. BRUMFIELD.
PLOW FENDER.
APPLICATION FILED SEPT. 18, 1913.
1,106,278.
Patented Aug. 4, 1914.
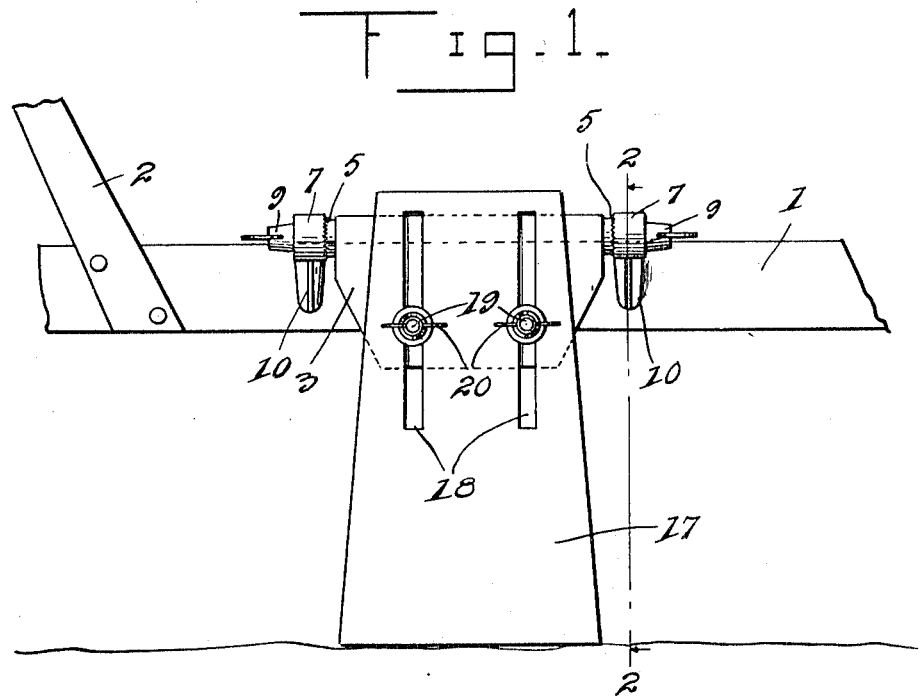
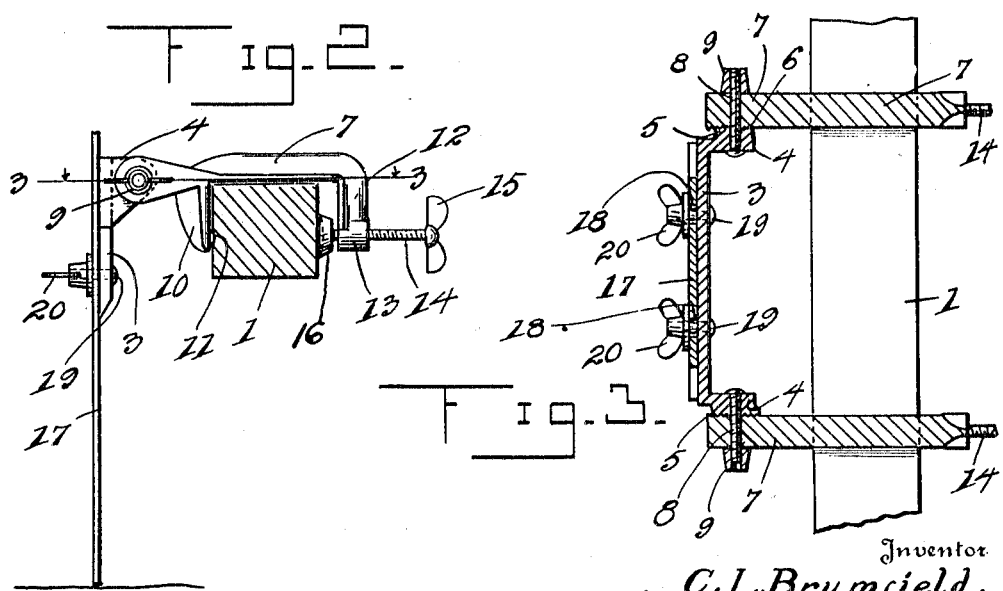
Witnesses
Inventor
C. L. Brumfield,
Attorney

UNITED STATES PATENT OFFICE.

CADWELL L. BRUMFIELD, OF SUNNY HILL, LOUISIANA.

PLOW-FENDER.

1,106,278.  Specification of Letters Patent.   Patented Aug. 4, 1914.

Application filed September 18, 1913.  Serial No. 790,471.

*To all whom it may concern:*

Be it known that I, CADWELL L. BRUMFIELD, a citizen of the United States, residing at Sunny Hill, in the parish of Washington and State of Louisiana, have invented certain new and useful Improvements in Plow-Fenders; and I do hereby declare the following to be a full, clear, and exact description of the invention, such as will enable others skilled in the art to which it appertains to make and use the same.

This invention relates to plow fenders and is designed as an improvement upon the patent to Cadwell L. Brumfield, No. 1,067,638, patented July 15, 1913, and relates to improved means for connecting the fender as a whole to the plow beam and to permit the same to be readily removed therefrom.

Another object of the invention is to provide a plow fender which can be readily swung at its lower end in and out, toward and from the plow beam, and at the same time be permitted a longitudinal adjustment relatively to the beam.

In the patent hereinbefore referred to the means for supporting the fender comprised a bar rigidly connected to the beam and extending outwardly therefrom. This supporting member was permanently bolted to the beam and thus when the device was to be removed it was necessary to remove the bolt. Moreover, the entire fender was not readily attachable to a plow beam without boring a hole through the same.

My present improvements contemplate means for supporting the fender in a manner which will permit ready attachment to the beam without requiring bolt holes and at the same time will permit the fender to be removed quickly and applied to another plow.

The objects and advantages above referred to may be attained by means of the construction illustrated in the accompanying drawings, in which, Figure 1 is a side elevation of a plow fender made in accordance with this invention, the beam and handles of the plow being broken away, Fig. 2 is a vertical sectional view taken on the line 2—2 of Fig. 1, looking in the direction indicated by the arrow, and Fig. 3 is a horizontal sectional view taken on the line 3—3 of Fig. 2, looking in the direction indicated by the arrow.

Referring to the drawings the numeral 1 designates the plow beam which may be of the usual, or any suitable construction, and 2 the handles of the plow.

The improved plow fender comprises a plate 3, having spaced lugs or ears 4 extending at rightangles thereto, said ears are provided with a boss 5 projecting from the outer side thereof, said bosses being roughened as at 6 to engage the clamp members 7. Binding screws 8 extend through the clamp members, through the bosses 5 and through the lugs 4, said binding screws being provided with wing nuts 9 for firmly clamping the plate 3 at any desired inclination relatively to the beam.

The clamp members 7 are each provided with an integral member 10 provided with a projection 11 adapted to embed itself within the beam 1 when the clamps are secured in place. The opposite member 12 of the clamp is provided with a threaded boss 13 through which extends the binding screw 14 having a winged head 15 and an enlargement 16 to bear against the side of the beam 1.

The fender plate 17 is provided with parallel slots 18 through which the adjusting screws 19 are passed, said screws extending through the supporting plate 3 and being provided with wing nuts 20 for securing the fender in adjusted position.

From the foregoing it will be obvious that my present improvement will permit the attachment of the fender to any form of plow beam without alteration either in the beam or the attaching means for the fender and that after the fender has been adjusted at the desired inclination to the beam it will not be liable to become displaced or slip, owing to the roughened bosses 6.

My invention can be manufactured at low cost, is reliable and efficient for its purpose and can be quickly connected to, or disconnected from, any plow beam.

What I claim is:—

A pair of U-shaped clamps each having a horizontally disposed integral arm, a binding screw extending through each clamp for connecting and disconnecting the clamp to and from a plow beam, a supporting plate provided with angularly disposed lugs having perforated bosses adjustably pivoted to the integral arms of the clamps, said supporting plate being disposed between said arms and extending at an angle thereto, and a fender plate adjustably secured to said supporting plate.

In testimony whereof I affix my signature in presence of two witnesses.

CADWELL L. BRUMFIELD.

Witnesses:
E. O. ALFORD,
J. A. MAGEE.

Copies of this patent may be obtained for five cents each, by addressing the "Commissioner of Patents, Washington, D. C."